Figure 4:
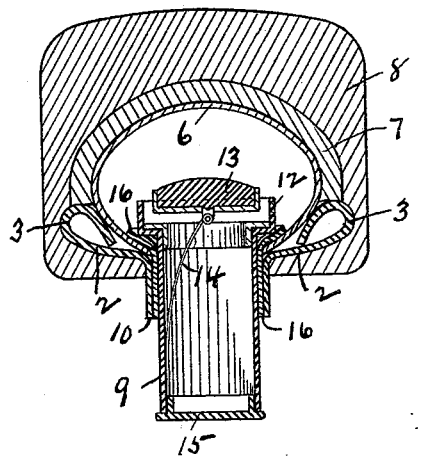

(No Model.) 2 Sheets—Sheet 1.
G. J. LOOMIS.
BICYCLE WHEEL.
No. 543,099. Patented July 23, 1895.
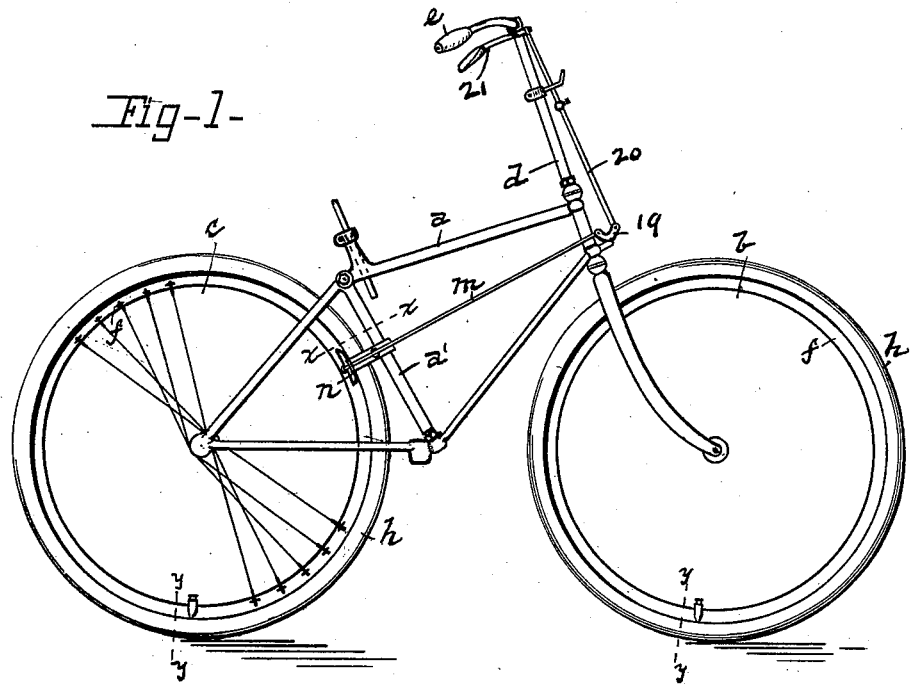
Fig-1-
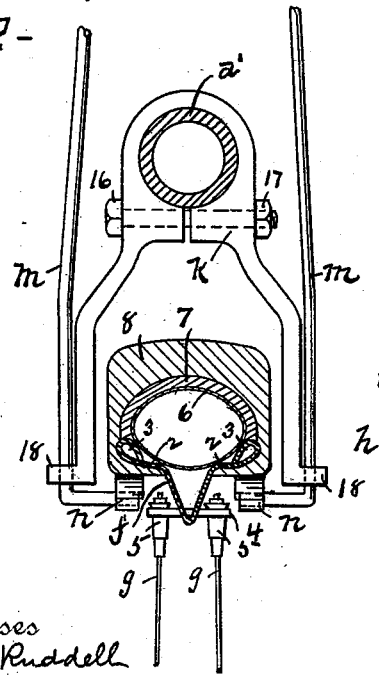
Fig-2-
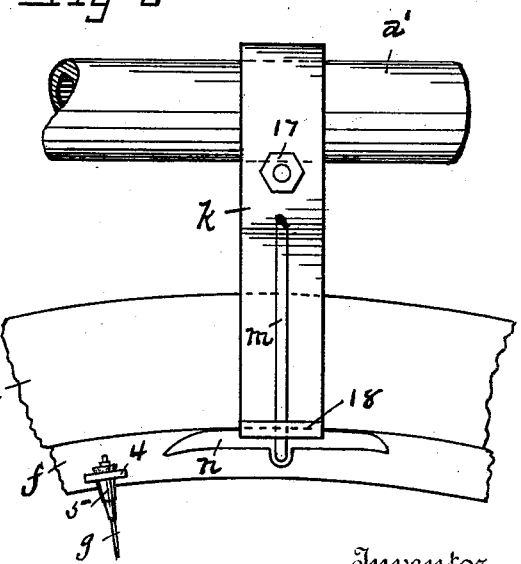
Fig-3-
Witnesses
Robt Ruddell
J. E. Chapman
Inventor
G. J. Loomis
By Hawes & Chapman
Attorneys (No Model.) 2 Sheets—Sheet 2.

G. J. LOOMIS.
BICYCLE WHEEL.

No. 543,099. Patented July 23, 1895.

Witnesses
Robt Ruddell
J. E. Chapman

Inventor
G. J. Loomis
By Hawes Chapman
Attorneys.

UNITED STATES PATENT OFFICE.

GILBERT J. LOOMIS, OF WESTFIELD, MASSACHUSETTS.

BICYCLE-WHEEL.

SPECIFICATION forming part of Letters Patent No. 543,099, dated July 23, 1895.

Application filed April 2, 1892. Serial No. 427,477. (No model.)

*To all whom it may concern:*

Be it known that I, GILBERT J. LOOMIS, of Westfield, in the county of Hampden and State of Massachusetts, have invented certain new and useful Improvements in Bicycles, of which the following is a specification, reference being had to the accompanying drawings, forming part thereof.

My invention relates especially to bicycles the wheels of which are provided with pneumatic tires, and it has for its objects to improve the construction of the tire itself with a view to preventing the possibility of its being punctured by nails and other pointed objects and thereby rendered unserviceable, and to provide an improved form of rim to be used in connection with a pneumatic tire and having a novel form of valve to permit the ready inflation of said tire.

To these ends my invention consists in the construction and arrangement of parts hereinafter fully described, and particularly pointed out in the claims.

Referring to the drawings, in which like letters designate like parts in the several views, Figure 1 is a side elevation of a safety-bicycle embodying my invention. Fig. 2 is a cross-section of the rim and tire of the rear wheel and of the middle brace of the frame, taken upon line *x x* of Fig. 1, said view also showing a plan view of the brake mechanism. Fig. 3 is a side view of the parts shown in Fig. 2. Fig. 4 is a cross-section of the rim and tire, taken at *y y*, Fig. 1, showing the valve through which air is forced to inflate the tire.

The letter *a* designates the diamond-shaped frame; *b*, the steering-wheel; *c*, the driving-wheel; *d*, the steering-post, and *e* the handle-bar of a common form of safety-bicycle, the driving-gear and saddle being omitted. Of said wheels *f* designates the rim, *g* the spokes, and *h* the pneumatic tire. The rim *f* is made V-shaped in cross-section, as shown in Fig. 2, its two sides at its outer edge being bent to substantially a horizontal position, as shown at 2 2, and then bent inwardly upon themselves to form the loops 3 3 at their extreme edges. The spokes *g* are connected to the rim by means of short bars 4 inserted within holes drilled through the rim near the apex forming its inner edge, said bars having a hole near each end thereof to receive the nipples 5, in which the outer ends of the spokes are secured in the usual manner, two spokes being thus connected to each bar. By such construction I not only secure a rim possessing great rigidity and strength, but I also secure a very strong and durable connection between the rim and spokes, and one which enables a bent or broken spoke to be quickly and readily removed and a new one inserted without disturbing the remaining spokes or the tire.

The tire is composed of the inner air-tube 6, which rests against the horizontal portions 2 and loops 3 of the rim, a lining 7, made of horse-hide or other similar material, capable of withstanding nails and other pointed objects without being punctured, which lining covers the outer side of said air-tube 6, and the outer tread-rubber 8, which is preferably made of substantially-rectangular shape in cross-section at its outer edge and at its inner edges embraces the loops 3 and horizontal portions 2 of the rim, as shown in Figs. 2 and 4, said inner edges being cemented to the rim, as is customary. The tire thus constructed secures all of the advantages incident to pneumatic tires as heretofore made and possesses the additional advantage that it cannot be rendered unserviceable by being punctured by nails, pieces of glass, or other sharp objects in the roadway. The air-tube 6 is inflated in the usual manner, and to facilitate such operation and to prevent leakage of the air I have devised the valve device shown in Fig. 4, consisting of a tube 9, which passes through a tubular nipple 10 in the rim *f* into said air-tube. At its inner end said tube 9 is provided with the annular offset-shoulder 12, the inner side of which is faced with soft rubber and which forms a seat to receive the valve-plug 13, the inner side of which is also preferably faced with soft rubber or similar material. A spring 14 connected at one end to said plug and secured at its opposite end to the tube 9 serves to normally hold said plug against its seat while permitting it to yield to the pressure of the air as the latter is forced through the tube 9. Said valve-plug thus acts as a check-valve and, being forced to its seat by the pressure of the air within the air-tube, effectually prevents any escape of air from the latter. At its outer end the tube 9 is provided with a removable cap 15, which keeps the tube free from dirt.

To the middle brace $a'$ of the frame $a$, or to some other convenient portion of the frame, is secured a forked bracket $k$, the arms of which extend rearwardly upon either side of the rim of the rear wheel, as shown in Fig. 2. As herein shown, the body portion of said bracket is made in the form of a split ring, which embraces the brace $a'$ and is tightened about the latter by a bolt 16 and nut 17; but any other convenient means for making such connection can be used, if desired. At their outer ends the arms of said bracket are provided with an outwardly-turned flange 18, through which flanges are made holes to receive the rods $m$, said rods being pivotally connected at their front end to the usual elbow-lever 19, operated by the rod 20 and brake-lever 21 in the usual manner. At their rear end said rods $m$ are bent inwardly at substantially a right angle to their main portion, and to the outer ends of said bent portions thereof are pivotally secured the brake-shoes $n$, which shoes are adapted to bear against the inner side of the rim $f$ through the medium of the lapped-over edges of the tread-rubber 8 at each side of the V-shaped portion of said rim. The acting faces of said brake-shoes are curved to conform to the curvature of the rim, and are preferably beveled off at each end, as shown in Fig. 3. By raising the brake-lever 21 and depressing the rod 20 and rocking the elbow-lever 19 in the usual manner the shoes $n$ are drawn by the rods $m$ against the inner surface of the rim in such manner as to secure a powerful braking action without injury to the pneumatic tire, and also without injury to the wheel, the pulling strain of said shoes against the rim being exerted in a direct line with the resisting force of the spokes $g$ in such manner as to prevent any deflection of the rim.

In connection with the novel means shown in Fig. 4 for facilitating the inflation of the tire I have devised means for securely anchoring the tube 9 in its operative position in such manner that it cannot become loosened and forced out of the nipple in the rim by the pressure of air within the air-tube 6 nor from said air-tube. Such means consist of a reinforce in the form of a short tube of soft rubber 16, which surrounds the tube 9 within the nipple 10 of the rim, and has its inner end extended within the air-tube 6 and made flaring, as shown, whereby it is caused to overlap the inner surface of said air-tube around the opening made in the latter to receive the tube 9. Said overlapping inner end of the reinforce 16 is cemented to the inner surface of the air-tube and its inner surface is cemented to the tube 9, and in this manner said tube is securely anchored to the air-tube and is prevented from becoming loose. Said reinforce also forms an additional safeguard against the leakage of air around the tube 9. I do not wish to limit myself to the use of soft rubber as the material composing said reinforce, as other materials can be used; but I prefer to employ rubber.

Having thus fully described my invention, what I claim, and desire to secure by Letters Patent, is—

1. In a wheel for bicycles, the combination with the rim having substantially a V-shape in cross-section, of a series of bars passed transversely through said rim near its apex, and means substantially as described for connecting the outer ends of two of the wheel-spokes to each of said bars, upon opposite sides of the apex of said rim, substantially as set forth.

2. In a wheel for bicycles, the combination with a rim having substantially a V-shape in cross-section and having its two sides bent in opposite directions to substantially a horizontal position and then bent inwardly upon themselves to form rounded edges for the rim, of a tire composed of an inner, elastic air-tube resting against said rim between the rounded edges of the latter, a lining composed of horse-hide or other similar, impenetrable material, covering the outer side of said air-tube, and an outer, tread-covering of soft-rubber embracing said air-tube and lining, and having its edges joined to said rim at each side of the apex of the latter, substantially as described.

3. The combination with a wheel-rim and pneumatic tire encircling said rim, said rim being provided with a tubular nipple upon its inner side, of a tube passing through said nipple into the air-tube of said tire, said tube having its inner end provided with a flanged shoulder faced with elastic material, and having at its outer end a removable cap, a valve-plug adapted to close the inner end of said tube by its engagement with the flanged shoulder on the latter, and a spring connecting said plug to said tube, substantially as and for the purpose described.

4. In a wheel for a bicycle, the combination with the substantially V-shaped rim $f$, of the series of bars 4 passing transversely through said rim near its apex, nipples 5 seated in said bars near each end thereof, and spokes $g$ having their outer ends seated within said nipples, substantially as set forth.

5. The combination with a wheel-rim and a pneumatic tire applied to said rim, said tire having an inner elastic air-tube, of an inflating tube passing through said rim into said air-tube and having its inner end provided with a check-valve, and a reinforce tube surrounding said inflating tube and positively fastened thereto, said reinforce extending into the air-tube and having its inner end positively fastened thereto, substantially as and for the purpose described.

6. The combination with a wheel-rim, as $f$, having a nipple, as 10, and a pneumatic tire applied to said rim and having an inner air-tube, as 6, of the tube 9 passing through the nipple in said rim into said air-tube and having a check-valve at its inner end, and the reinforce tube 16 of soft rubber, surrounding said tube 9, said reinforce tube having its inner end flared and secured to the inner surface of the air-tube by cement and having its inner surface cemented to said tube 9, substantially as and for the purpose set forth.

GILBERT J. LOOMIS.

Witnesses:
W. H. CHAPMAN,
J. E. CHAPMAN.